(12) United States Patent
Xie et al.

(10) Patent No.: US 9,864,855 B2
(45) Date of Patent: Jan. 9, 2018

(54) VERIFICATION DATA PROCESSING METHOD AND DEVICE AND STORAGE MEDIUM

(71) Applicant: TENCENT TECHNOLOGY (SHENZHEN) COMPANY LIMITED, Guangdong (CN)

(72) Inventors: Yuanhui Xie, Guangdong (CN); Guoping Yan, Guangdong (CN); Yuye Wang, Guangdong (CN)

(73) Assignee: TENCENT TECHNOLOGY (SHENZHEN) COMPANY LIMITED, Guangdon (CN)

( * ) Notice: Subject to any disclaimer, the term of this patent is extended or adjusted under 35 U.S.C. 154(b) by 211 days.

(21) Appl. No.: 14/978,748

(22) Filed: Dec. 22, 2015

(65) Prior Publication Data

US 2016/0188866 A1    Jun. 30, 2016

Related U.S. Application Data

(63) Continuation of application No. PCT/CN2014/080528, filed on Jun. 23, 2014.

(30) Foreign Application Priority Data

Sep. 18, 2013 (CN) .......................... 2013 1 0426267

(51) Int. Cl.
*G06F 21/36* (2013.01)
*G06F 21/31* (2013.01)
(Continued)

(52) U.S. Cl.
CPC ........ *G06F 21/36* (2013.01); *G06F 17/30949* (2013.01); *G06F 21/316* (2013.01);
(Continued)

(58) Field of Classification Search
CPC ... G06F 21/30; G06F 21/36; G06F 2221/2133
See application file for complete search history.

(56) References Cited

U.S. PATENT DOCUMENTS

| | | | | |
|---|---|---|---|---|
| 2009/0076965 A1* | 3/2009 | Elson | ...................... | G06F 21/36 705/55 |
| 2010/0031330 A1* | 2/2010 | Von Ahn | ................. | G06F 21/36 726/5 |

(Continued)

FOREIGN PATENT DOCUMENTS

| | | |
|---|---|---|
| CN | 103210607 A | 7/2013 |
| KR | 20130085566 A | 7/2013 |

*Primary Examiner* — David Pearson
(74) *Attorney, Agent, or Firm* — McDonald Hopkins LLC

(57) ABSTRACT

A verification data processing method includes: receiving CAPTCHA response information sent by user through a user terminal and obtaining an IP address of the user terminal from the CAPTCHA response information; obtaining verification data by verifying the CAPTCHA response information, and storing the verification data in a preset hash table, where the verification data includes the type of a CAPTCHA code corresponding to the CAPTCHA response information, and the number of total verifications of CAPTCHA response information and the number of correct verifications both corresponding to the IP address; determining a user type of the user according to the IP address, the number of total verifications and the number of correct verifications; storing the verification data in a min-heap according to the CAPTCHA code type and the user type; and making a statistic of all the numbers of total verifications and all the numbers of correct verifications in the min-heap.

15 Claims, 11 Drawing Sheets

(51) Int. Cl.
  *H04L 9/32* (2006.01)
  *G06F 17/30* (2006.01)
  *G06F 21/62* (2013.01)
(52) U.S. Cl.
  CPC ........ *G06F 21/6218* (2013.01); *H04L 9/3226*
     (2013.01); *G06F 2221/2133* (2013.01)

(56) References Cited

U.S. PATENT DOCUMENTS

| | | | |
|---|---|---|---|
| 2013/0097697 A1* | 4/2013 | Zhu | G06F 21/31 |
| | | | 726/18 |
| 2013/0145441 A1 | 6/2013 | Mujumdar et al. | |
| 2013/0205386 A1 | 8/2013 | Thompson | |
| 2013/0216027 A1 | 8/2013 | Rados et al. | |
| 2013/0347067 A1* | 12/2013 | Li | G06F 21/31 |
| | | | 726/3 |
| 2014/0250538 A1* | 9/2014 | Rapaport | G06F 21/31 |
| | | | 726/28 |

\* cited by examiner

VERIFICATION DATA PROCESSING METHOD AND DEVICE AND STORAGE MEDIUM

CROSS-REFERENCE TO RELATED APPLICATION

This application is a continuation application of PCT Patent Application No. PCT/CN2014/080528, entitled "VERIFICATION DATA PROCESSING METHOD AND DEVICE AND STORAGE MEDIUM" filed on Jun. 23, 2014, which claims priority to Chinese Patent Application No. 201310426267.2, entitled "VERIFICATION DATA PROCESSING METHOD AND DEVICE" filed on Sep. 18, 2013, both of which are incorporated by reference in their entireties.

TECHNICAL FIELD

The present disclosure relates to the field of computer technologies, and in particular to a verification data processing method and device and a storage medium.

BACKGROUND

A Completely Automated Public Turing test to tell Computers and Humans Apart (CAPTCHA) is an auxiliary verifying means which is commonly used in Internet services to fight against automations (i.e. computer programs), and is mainly used in scenarios including account registration, login, forum posting, microblog posting and the like. The quality of a CAPTCHA depends on both a cracking rate by automations and a human passing rate, where the cracking rate by automations means a rate of recognizing CAPTCHA codes by automations, and the human passing rate means a rate of recognizing CAPTCHA codes by ordinary users. The CAPTCHA has a good verification effect if the automatic cracking rate of the CAPTCHA is low and the human passing rate of the CAPTCHA is high. In the existing verification data processing, a total passing rate of a CAPTCHA within one minute is calculated generally according to a formula of total passing rate=[100*C(v)/S(v)]%, where S(v) denotes the number of total verifications of CAPTCHA response information and C(v) denotes the number of correct verifications of CAPTCHA response information (i.e. the number of pieces of CAPTCHA response information passing verifications) within a minute. However, the total passing rate of the CAPTCHA obtained by such method is simple and rough and has low accuracy, and hence is almost useless in estimating the cracking resistance and cracking difficulty of the CAPTCHA.

It is noted that this section provides background information related to the present disclosure which is not necessarily prior art.

SUMMARY

In view of the above, embodiments of the present invention provide a verification data processing method and device and a storage medium, to improve the accuracy of the result of the verification data processing.

A verification data processing method includes: receiving, by a server, CAPTCHA response information that is sent by a user through a user terminal; obtaining an IP address of the user terminal from the CAPTCHA response information; obtaining verification data by verifying the CAPTCHA response information; storing the verification data in a preset hash table, wherein the verification data comprises a type of a CAPTCHA code corresponding to the CAPTCHA response information, and the number of total verifications of CAPTCHA response information and the number of correct verifications among the total verifications which both correspond to the IP address of the user terminal; determining a user type of the user according to the IP address of the user terminal, the number of total verifications and the number of correct verifications; storing the verification data in a min-heap according to the type of the CAPTCHA code and the user type of the user; and making a statistic of all the numbers of total verifications and all the numbers of correct verifications in the min-heap, to obtain a passing rate of CAPTCHA codes which correspond to the CAPTCHA response information from which all the verification data in the min-heap is obtained.

A verification data processing device includes one or more processors operating in conjunction with a memory and a plurality of modules, where the plurality of modules include: a CAPTCHA response information receiving module, which is configured to receive CAPTCHA response information that is sent by a user through a user terminal, and to obtain an IP address of the user terminal from the received CAPTCHA response information; a CAPTCHA obtaining and storing module, which is configured to obtain verification data by verifying the CAPTCHA response information obtained by the CAPTCHA response information receiving module, and to store the verification data in a preset hash table, wherein the verification data comprises a type of a CAPTCHA code corresponding to the CAPTCHA response information, a number of total verifications of the CAPTCHA response information and a number of correct verifications among the total verifications which both correspond to the IP address of the user terminal; a user type determining module, which is configured to determine a user type of the user according to the IP address of the user terminal obtained by the CAPTCHA response information receiving module, the number of total verifications and the number of correct verifications obtained by the CAPTCHA obtaining and storing module; a verification data storing module, which is configured to store the verification data in a min-heap according to the type of the CAPTCHA code obtained by the verification data obtaining and storing module and the user type of the user obtained by the user type determining module; and a statistical module, which is configured to make a statistic of all the numbers of total verifications and all the numbers of correct verifications in the min-heap, to obtain a passing rate of CAPTCHA codes that correspond to the CAPTCHA response information from which all the verification data in the min-heap is obtained.

Further a storage medium including computer-executable instructions is provided by the present disclosure, where the computer-executable instructions are configured to perform a verification data processing method when being executed by a computer processor, and the method includes: receiving CAPTCHA response information that is sent by a user through a user terminal; obtaining an IP address of the user terminal from the CAPTCHA response information; obtaining verification data by verifying the CAPTCHA response information, and storing the verification data in a preset hash table, wherein the verification data comprises a type of a CAPTCHA code corresponding to the CAPTCHA response information, and a number of total verifications of CAPTCHA response information and a number of correct verifications among the total verifications which both correspond to the IP address of the user terminal; determining a user type of the user according to the IP address of the user terminal, the number of total verifications and the number of correct verifications; storing the verification data in a min-heap according to the type of the CAPTCHA code and the user type of the user; and making a statistic of all the numbers of total verifications and all the numbers of correct verifications in the min-heap, to obtain a passing rate of CAPTCHA codes which correspond to the CAPTCHA response information from which all the verification data in the min-heap is obtained.

In the verification data processing method and device, the verification data is configured in the corresponding min-heap according to the user type and the CAPTCHA code type, and a statistic on the verification data in the min-heap is made to obtain the passing rate of CAPTCHA codes. Since each min-heap corresponds to one user type and one CAPTCHA code type, the passing rate of each type of CAPTCHA codes with respect to each of different user types can be obtained from the statistics of the verification data in different min-heaps, which leads to strong pertinence, and thus the accuracy of the result of verification data processing is promoted so that the obtained passing rate of the CAPTCHA codes is more valuable.

Embodiments of the present invention will be described below in combination with the accompanying drawings, to make previous and other features and advantages of the present disclosure more apparent.

DETAILED DESCRIPTION OF THE EMBODIMENTS

The implementations, structures, features and effects of the present invention will be described below through embodiments in combination with accompanying drawings, for further describing the technical solutions and effects of the present disclosure.

A verification data processing method provided by embodiments of the present invention can be used for processing verification data of a CAPTCHA.

Figure 1:
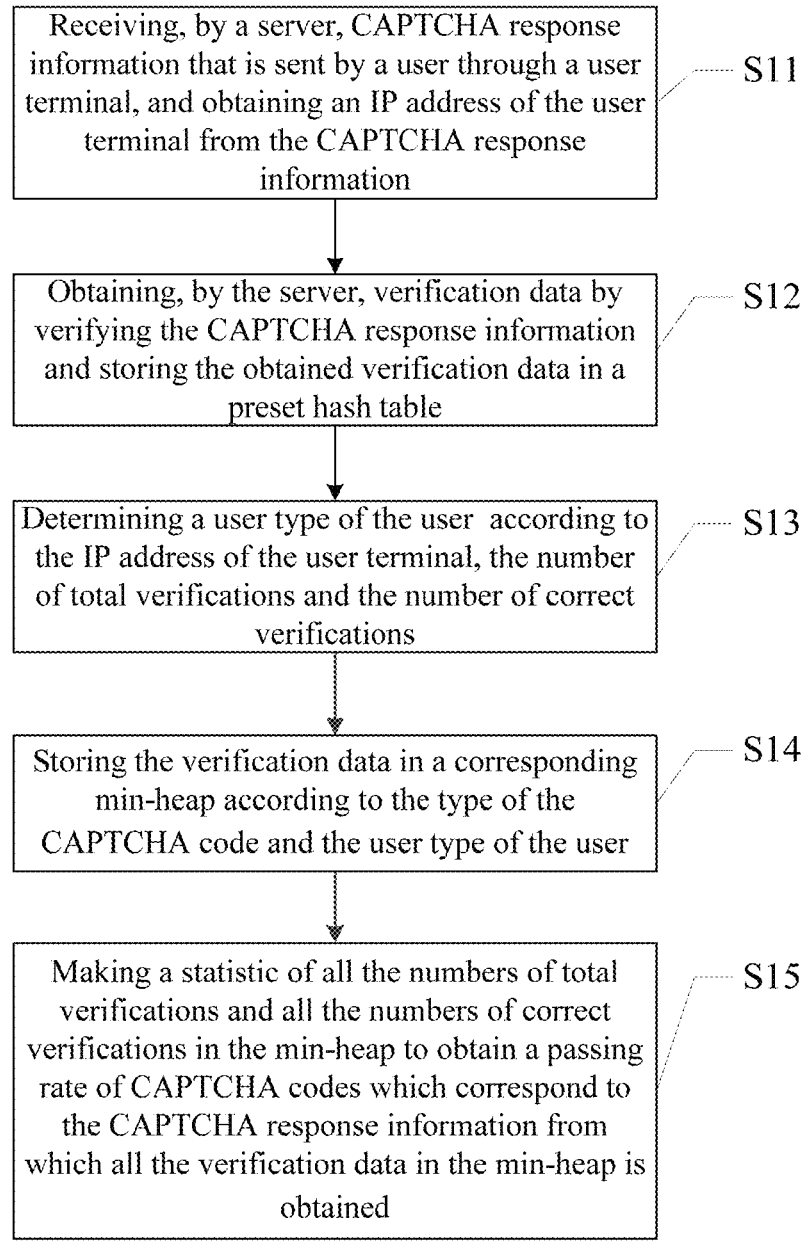
FIG. 1 is a flow chart of a verification data processing method according to an embodiment of the present invention.

FIG. 1 a flow chart of a verification data processing method according to an embodiment of the present invention. As illustrated in FIG. 1, the verification data processing method of the present embodiment includes the following steps S11, S12, S13, S14 and S15, which may be executed by a server.

Step S11: a server receives CAPTCHA response information which is sent by a user through a user terminal, and obtains an IP (Internet Protocol) address of the user terminal from the received CAPTCHA response information.

Particularly, the server sends a CAPTCHA code to the user terminal based on a service request from the user terminal; receives the CAPTCHA response information that is returned by the user through the user terminal according to the CAPTCHA code, where the CAPTCHA response information includes a CAPTCHA answer to the CAPTCHA code and the IP address of the user terminal; and obtains the IP address of the user terminal from the CAPTCHA response information.

Step S12: the server obtains verification data by verifying the CAPTCHA response information and stores the obtained verification data in a preset hash table.

Particularly, the server verifies the CAPTCHA response information to check whether the CAPTCHA answer to the CAPTCHA code in the CAPTCHA response information is matched with a preset CAPTCHA answer, and obtains verification result data; and then the server obtains the verification data from a statistic of the current verification result data and historical verification result data, and stores the obtained verification data in the preset hash table.

The historical verification result data are verification result data obtained by verifying the CAPTCHA response information from the user terminal with the same IP address in the past.

The verification data may particularly include: the type of a CAPTCHA code corresponding to the CAPTCHA response information, and the number of total verifications of CAPTCHA response information and the number of correct verifications among the total verifications, both corresponding to the IP address of the user terminal. The types of CAPTCHA codes may particularly include an alphabet type, a numeral type, a Chinese character type, an arithmetical type and the like, according to the form of the answer to the CAPTCHA code.

A hash table is a data structure which can be directly addressed and accessed according to a key value. An ordinary hash table may be regarded as a one-dimension array, and the key value may be converted to a position index for the array by a mapping function to quickly address a corresponding position. A multi-level hash table is an extended hash table which may be regarded as a two-dimension array formed by two ordinary hash tables in two dimensions, and an individual mapping function is provided for each dimension. In a particular embodiment, an IP address of the user terminal and the type of a CAPTCHA code are taken as a key value, which is used in storing the obtained verification data in a preset multi-level hash table. Because the time complexity (denoted O(n)) of addressing in the multi-level hash table is linear, the searching in the multi-level hash table can be completed quickly to satisfy system requirements. Therefore, if a data structure based on the multi-level hash table is used for storing the verification data as global data, the speed of accessing the verification data can be promoted, and the whole processing efficiency of the verification data can be promoted.

Step S13: a user type of the user is determined according to the IP address of the user terminal, the number of total verifications and the number of correct verifications.

Particularly, the server determines the user type of the user (e.g. the type of the group sending the CAPTCHA response information) according to the alphabet of the user terminal, the number of total verifications and the number of correct verifications both corresponding to the IP address of the user terminal. As utilized herein, there are three user types, e.g. an ordinary user type, a code worker type, and an automation type. The code worker type refers to the type of human who is specialized in inputting answers to CAPTCHA codes, and the automation refers to a computer program for automatically recognizing CAPTCHA images using various image algorithms.

Step S14: the verification data is stored in a corresponding min-heap according to the type of the CAPTCHA code and the user type of the user.

The min-heap is a complete binary tree with sorted nodes, where any node of the tree other than terminal nodes (i.e. leaf nodes) of the tree has a value no more than the values of a left child node and a right child node thereof. The value of a root node is the smallest one among the values of all the nodes in the min-heap. A plurality of min-heaps respectively corresponding to different CAPTCHA code types and different user types can be preset in the server. According to a CAPTCHA code type and a user type, the server may address a min-heap corresponding to the CAPTCHA code type and the user type, and then store the obtained verification data in the min-heap.

Step S15: a statistic of all the numbers of total verifications and all the numbers of correct verifications in the min-heap is made to obtain a passing rate of CAPTCHA codes which correspond to the CAPTCHA response information from which all the verification data in the min-heap is obtained.

Particularly, the server calculates weighted averages of all the numbers of total verifications and all the numbers of correct verifications in the min-heap, to calculate the passing rate of the CAPTCHA codes which correspond to the CAPTCHA response information from which all the verification data in the min-heap is obtained.

In the verification data processing method according to the present embodiment, the verification data is configured in the corresponding min-heap according to the user type and the CAPTCHA code type, and a statistic on the verification data in the min-heap is made to obtain the passing rate of CAPTCHA codes. Since each min-heap corresponds to one user type and one CAPTCHA code type, the passing rate of each type of CAPTCHA codes with respect to each of different user types can be obtained from the statistics of the verification data in different min-heaps, which leads to strong pertinence, and thus the accuracy of the result of verification data processing is promoted so that the obtained passing rate of the CAPTCHA codes is more valuable.

Figure 2:
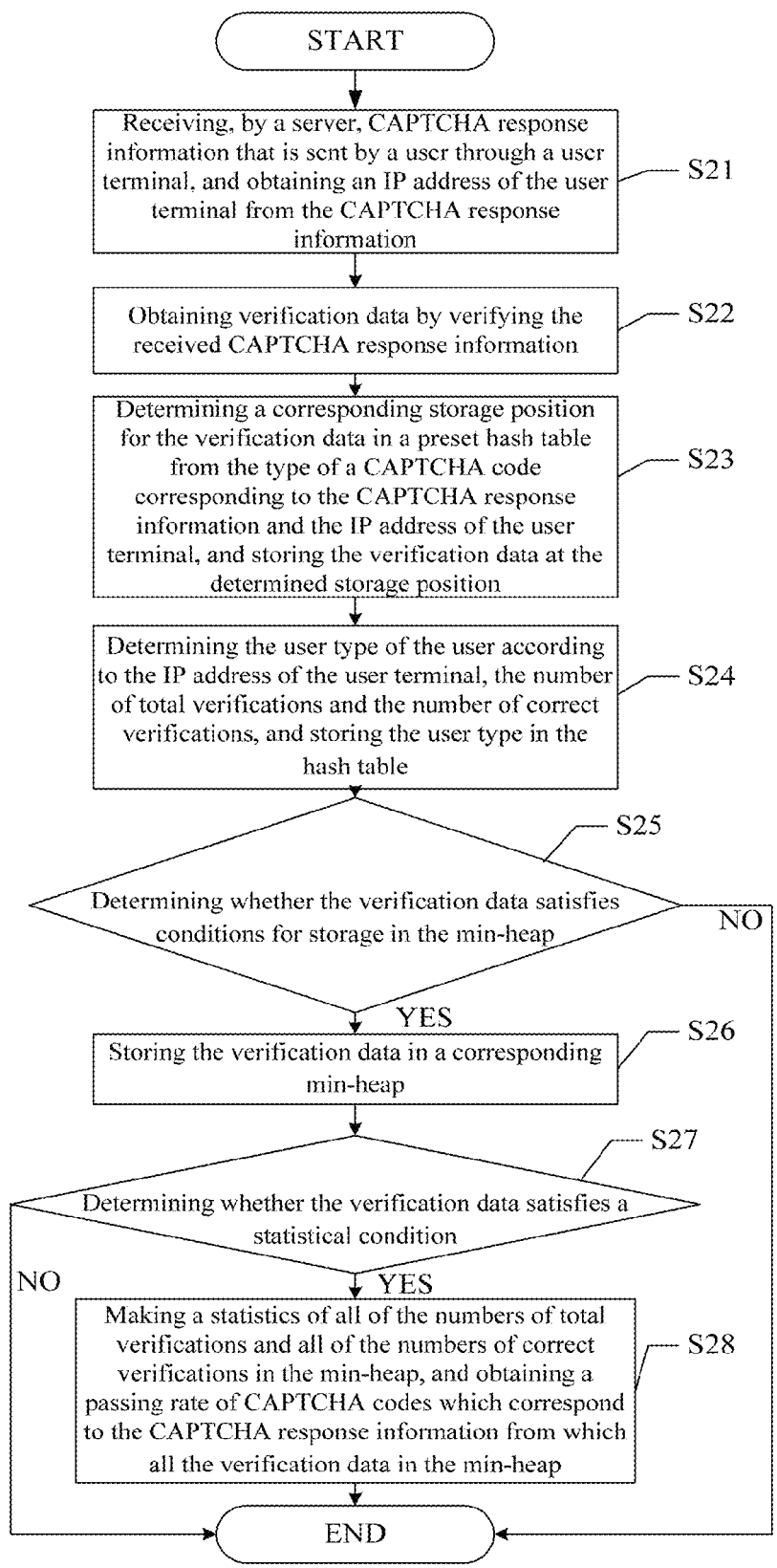
FIG. 2 is a flow chart of a verification data processing method according to another embodiment of the present invention.

FIG. 2 is a flow chart of a verification data processing method according to an embodiment of the present invention. As illustrated in FIG. 2, the verification data processing method of the present embodiment includes steps as follows.

Step S21: a server receives CAPTCHA response information which is sent by a user through a user terminal, and obtains an IP address of the user terminal from the CAPTCHA response information.

Step S22: verification data is obtained by verifying the received CAPTCHA response information.

Steps S21 and S22 are similar to Steps S11 and S12, and reference may be made to the above description on Steps S11 and S12, which will not be repeatedly described here.

Step S23: a corresponding storage position for the verification data in a preset hash table is determined from the type of a CAPTCHA code corresponding to the CAPTCHA response information and the IP address of the user terminal, and the verification data is stored at the determined storage position.

The server determines a corresponding storage position for the verification data in a preset multi-level hash table by taking the IP address of the user terminal and the type of the CAPTCHA code as a key value for the multi-level hash table, and then stores the verification data at the determined storage position. If the storage position is already stored with existing data, the existing data will be replaced by the verification data. If a storage position which corresponds to the IP address of the user terminal and the CAPTCHA code type does not previously exist in the multi-level hash table, i.e., the verification data is to be stored in the multi-level hash table for the first time, a free storage position in the multi-level hash table is selected as the corresponding storage position for the verification data, where the IP address of the user terminal and the CAPTCHA code type are considered as the key value for the storage position, and then the verification data is stored at the free storage position.

Step S24: the user type of the user is determined according to the IP address of the user terminal, the number of total verifications and the number of correct verifications; and the user type is stored in the hash table.

Figure 3:
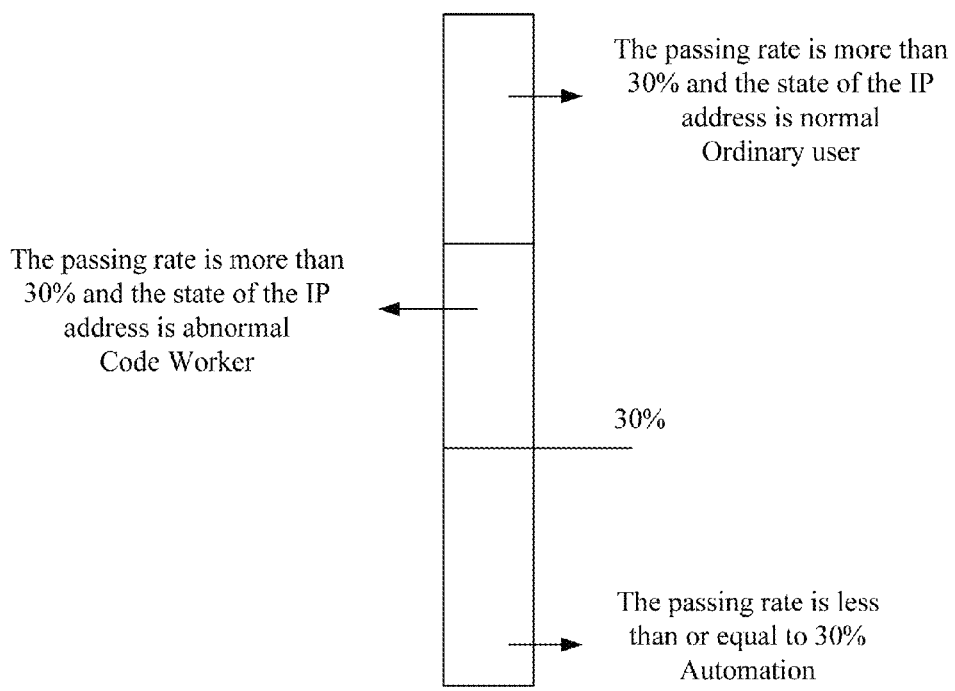
FIG. 3 is a schematic view showing the classification of user types in the verification data processing method according to the another embodiment of the present invention.

In a particular embodiment, as illustrated in FIG. 3, there are three user types, particularly including an ordinary user type, a code worker type and an automation type.

Figure 4:
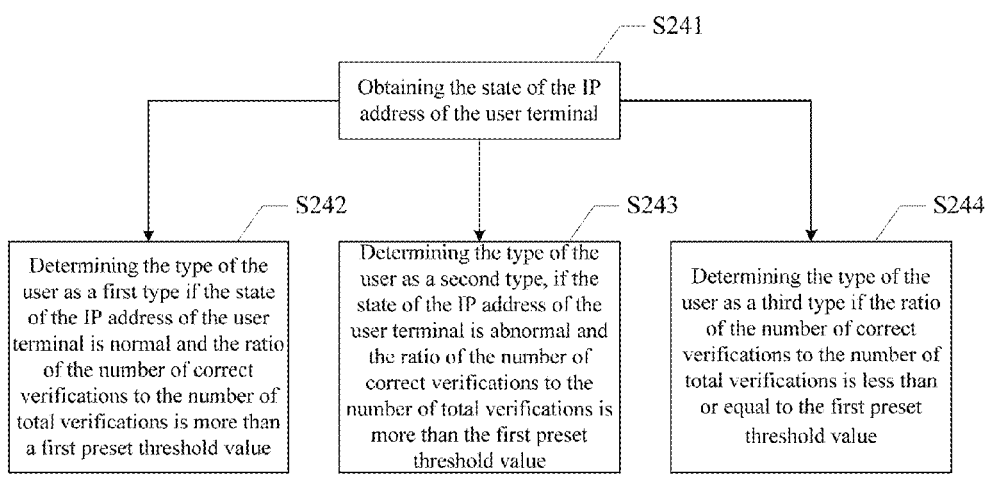
FIG. 4 is a particular flow chart showing partial steps of the verification data processing method according to the another embodiment of the present invention.

As illustrated in FIG. 4 in combination with FIG. 3, determining the user type of the user in this step may particularly include following Steps S241, S242, S243 and S244 as follows.

Step S241: the state of the IP address of the user terminal is obtained.

The state of the IP address of the user terminal may be particularly a normal state or an abnormal state. The abnormal state of the IP address of the user terminal means that the user of the user terminal with the IP address has delivered information which conforms to preset standards of abnormal information (such as junk information and pornography information) through services provided by a network operator. In a particular embodiment, the state of the IP address of the user terminal is collected by a security system server, and information of abnormal IP addresses sent by the security system server is received by the above server for verification and stored in an abnormal-information list. In this way, the state of the IP address of the user terminal may be obtained by querying the abnormal-information list.

Step S242: the type of the user is determined as a first type if the state of the IP address of the user terminal is normal and the ratio of the number of correct verifications to the number of total verifications is more than a first preset threshold value (e.g., a preset threshold ratio value).

In a particular embodiment, the first preset threshold value is 30%, and users of the first type are ordinary users. That is, the user of the user terminal is determined as an ordinary user if the state of the IP address of the user terminal is normal and the ratio of the number of correct verifications to the number of total verifications is more than 30%.

Step S243: the type of the user is determined as a second type, if the state of the IP address of the user terminal is abnormal and the ratio of the number of correct verifications to the number of total verifications is more than the first preset threshold value.

In a particular embodiment, a user of the second type is defined as a code worker. Thus, the user of the user terminal is determined as a code worker if the state of the IP address of the user terminal is abnormal and the ratio of the number of correct verifications to the number of total verifications is more than 30%.

Step S244: the type of the user is determined as a third type if the ratio of the number of correct verifications to the number of total verifications is less than or equal to the first preset threshold value.

In a particular embodiment, a user of the third type is defined as an automation. That is, the user of the user terminal is determined as an automation if the ratio of the number of correct verifications to the number of total verifications is less than or equal to 30%, no matter whether the IP address of the user terminal is abnormal or normal.

Step S25: it is determined whether the verification data satisfies conditions for storage in the min-heap.

In a particular embodiment, the verification data satisfies the conditions for storage in the min-heap if the number of total verifications corresponding to the IP address of the user terminal is more than a second preset threshold value (e.g., preset threshold value of nodes).

If the number of total verifications corresponding to the IP address of the user terminal is no more than the second preset threshold value, the verification data processing is ended.

If the number of total verifications corresponding to the IP address of the user terminal is more than the second preset threshold value, the method proceeds with Step S26 in which the verification data is stored in a corresponding min-heap according to the type of the CAPTCHA code and the user type of the user.

Figure 5:
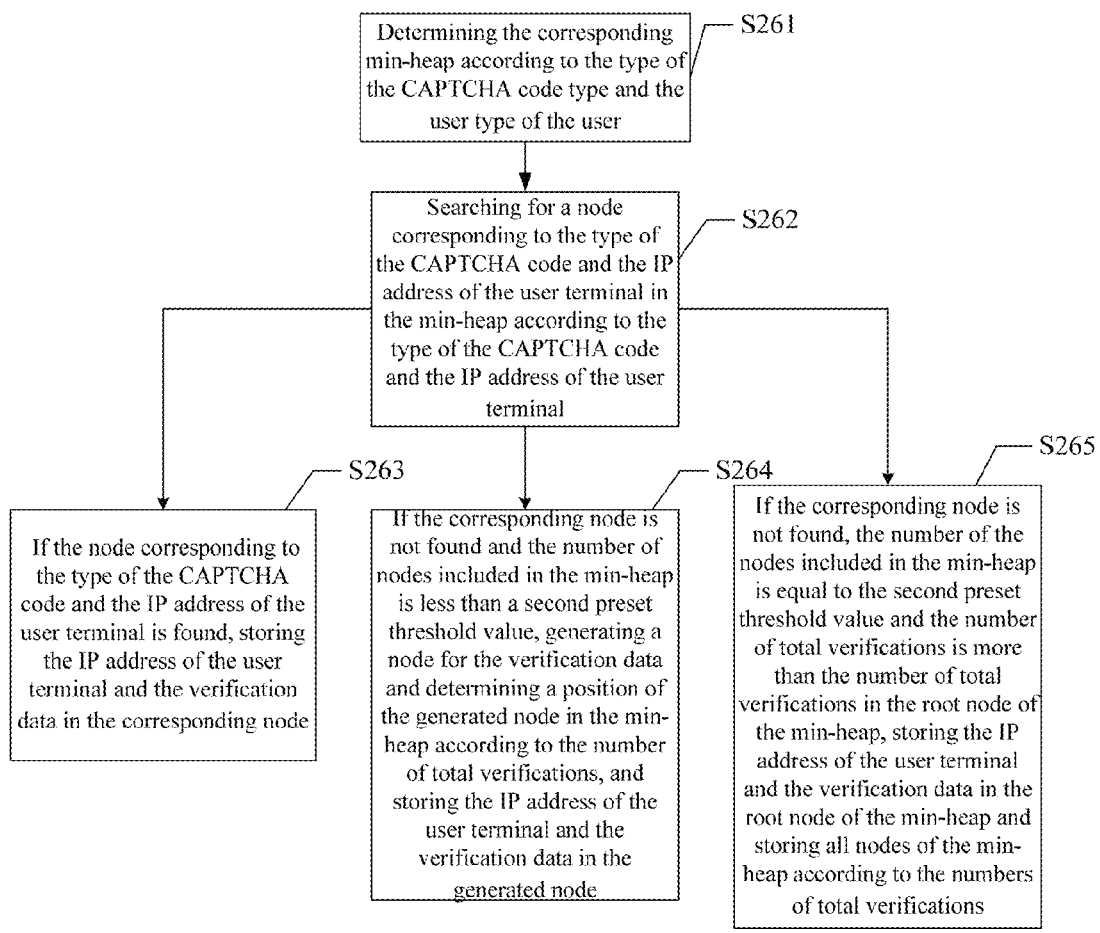
FIG. 5 is another particular flow chart showing partial steps of the verification data processing method according to the another embodiment of the present invention.

As illustrated in FIG. 5, storing the verification data in a corresponding min-heap in Step S26 includes the following Steps S261 to S265.

Step S261: the corresponding min-heap is determined according to the type of the CAPTCHA code type and the user type of the user.

For details of this step, reference may be made to the corresponding contents in the above embodiment, which will not be repeatedly described herein.

Step S262: a node corresponding to the type of the CAPTCHA code and the IP address of the user terminal is searched for in the min-heap according to the type of the CAPTCHA code and the IP address of the user terminal.

Particularly, a corresponding storage position in the preset hash table, which corresponds to the type of the CAPTCHA code and the IP address of the user terminal (that is, the type of the CAPTCHA code and the IP address of the user terminal are regarded as a key value of the corresponding storage position), is determined according to the type of the CAPTCHA code and the IP address of the user terminal, and min-heap index information stored in the storage position is obtained. The min-heap index information includes storage position information of the node in the min-heap that corresponds to the verification data, which can be considered as the sequence number of the node in the min-heap that corresponds to the verification data. Then, a node corresponding to the type of the CAPTCHA code and the IP address of the user terminal is searched for in the min-heap according to the obtained min-heap index information.

Step S263: if the node corresponding to the type of the CAPTCHA code and the IP address of the user terminal is found, the IP address of the user terminal and the verification data are stored in the corresponding node.

Particularly, if the corresponding node is found, the IP address of the user terminal and the verification data are stored into the corresponding node, i.e., the IP address of the user terminal and the verification data are written to the node.

Step S264: if the corresponding node is not found and the number of nodes included in the min-heap is less than a second preset threshold value, a node for the verification data is generated and a position of the generated node in the min-heap is determined according to the number of total verifications, and the IP address of the user terminal and the verification data are stored in the generated node.

Figure 6:
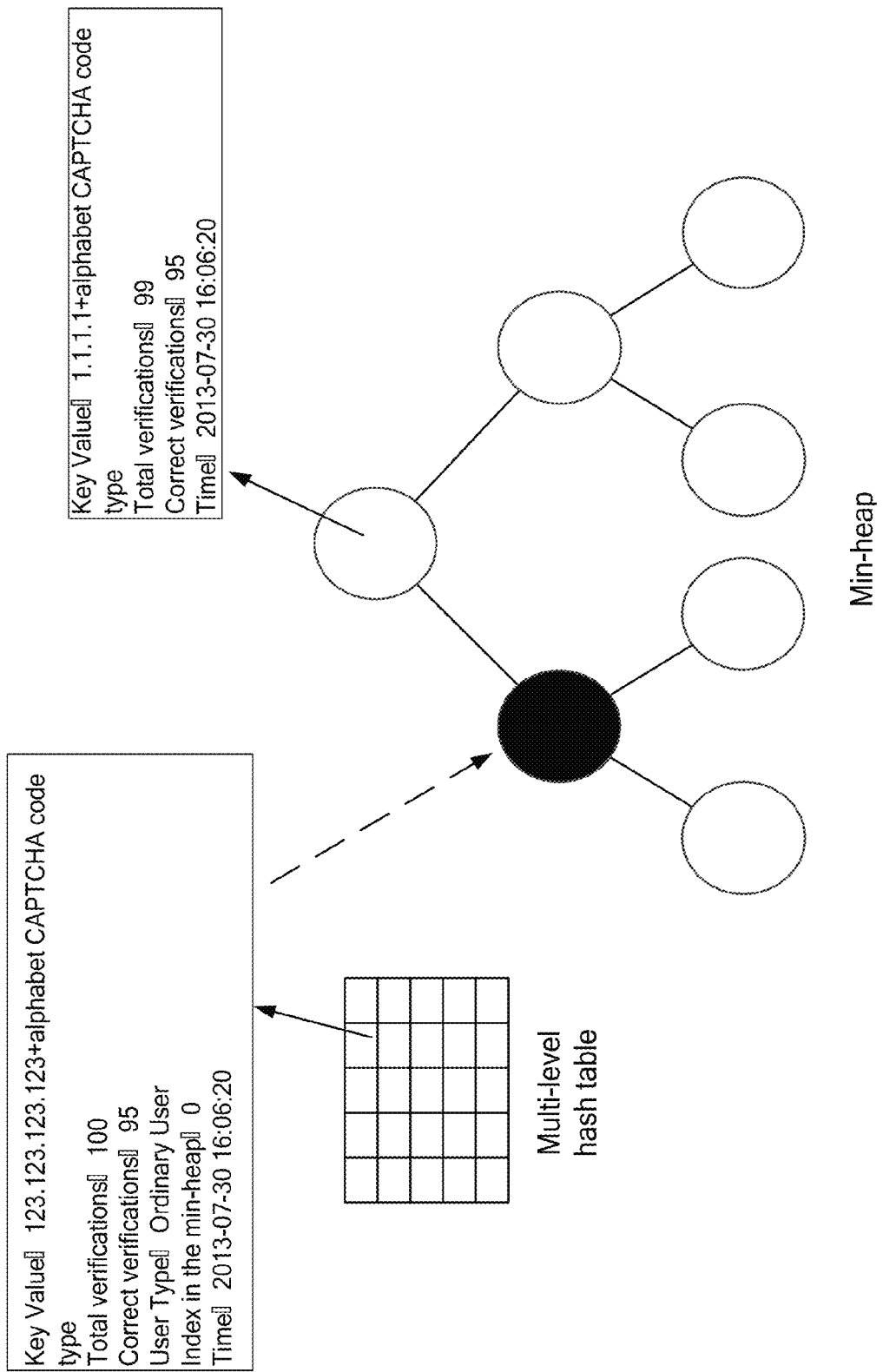
FIG. 6 is a schematic view showing a multi-level hash table and a min-heap used in the verification data processing method according to the another embodiment of the present invention.

Particularly, if the corresponding node is not found in the min-heap and the number of nodes included in the min-heap is less than the second preset threshold value such as 100, a node for the verification data is generated and a position of the generated node in the min-heap is determined from the number of total verifications, and the IP address of the user terminal and the verification data are stored in the generated node. At the same time, a sequence number of the generated node is determined according to a preset numbering rule, and stored at a corresponding storage position in the hash table as a min-heap index of the verification data. In a particular embodiment, nodes in the min-heap are preset, and if the corresponding node is not found in the min-heap and the number of nodes stored with verification data in the min-heap is less than a preset threshold value, the IP address of the user terminal and the verification data are stored in a node not yet stored with verification data (i.e. a free node) according to a preset storage rule, while the sequence number of the node is stored at a corresponding storage position in the hash table as the min-heap index of the verification data. For example, verification data corresponding to an IP address of 123.123.123.123 is obtained by a server, the CAPTCHA code type contained in the verification data is the alphabet type, and the user type is the ordinary user type, in this case, a min-heap corresponding to the verification data is determined by the server, where verification data stored in each node of the min-heap corresponds to the alphabet type and the ordinary user type. Then, the IP address of the user terminal and the type of the CAPTCHA code corresponding to the verification data are considered as a key value (i.e. 123.123.123.123+alphabet CAPTCHA code type) to obtain min-heap index information corresponding to the verification data from the multi-level hash table. As illustrated in FIG. 6, a min-heap index included in the obtained min-heap index information is 0 (i.e. the min-heap index information corresponding to verification data not yet stored in the min-heap is set as 0 by default in a system), which means that the verification data has not been stored in a min-heap; further, only the root node of the min-heap has been stored with verification data at this time, and the number of total verifications stored in the root node is 99 and the number of total verifications contained in the verification data to be stored is 100, as illustrated in FIG. 6, thus the verification data to be stored is stored in a left child node of the root node according to the preset storage rule, the IP address (123.123.123.123) of the user terminal and the type of the CAPTCHA code (i.e. the alphabet type) corresponding to the verification data are considered as a key value (i.e. 123.123.123.123+alphabet CAPTCHA code type) of the left child node, at the same time, the sequence number of the left child node is considered as the min-heap index of the verification data and stored at a corresponding storage position in the hash table.

Step S265: if the corresponding node is not found, the number of the nodes included in the min-heap is equal to the second preset threshold value and the number of total verifications is more than the number of total verifications in the root node of the min-heap, the IP address of the user terminal and the verification data are stored in the root node of the min-heap and all nodes of the min-heap are sorted according to the numbers of total verifications.

Particularly, if the node corresponding to the type of the CAPTCHA code and the IP address of the user terminal is not found in the min-heap, the number of the nodes included in the min-heap is equal to the second preset threshold value, and the number of total verifications contained in the verification data to be stored is more than the number of total verifications stored in the root node of the min-heap, the IP address of the user terminal and the verification data are stored in the root node in the min-heap, and all nodes in the min-heap are sorted. Meanwhile, the sequence number of the root node (which is assumed to be 1) is considered as a min-heap index of the verification data and stored at a corresponding storage position in the hash table.

The data structure of the min-heap is advantageous for a sampling statistics of the verification data. In the case that a min-heap including 100 nodes (which can store 100 elements) is maintained, one hundred IP addresses corresponding to the most total verifications (i.e. the most submissions of CAPTCHA answers) are selected as statistical objects. In addition, the time complexity for updating the min-heap is O(n*Log(n)), which satisfies the system requirements. Furthermore, in each instance of determining whether verification data corresponding to a certain IP address needs to be stored in a min-heap, the verification data needs to be compared merely with the root node at the top of the min-heap, therefore the efficiency of the verification data processing is promoted.

Step S27: it is determined whether the verification data satisfies a statistical condition.

In a particular embodiment, if the number of nodes in the min-heap is more than the second preset threshold value, the statistical condition is satisfied.

If the number of nodes in the min-heap is no more than the second preset threshold value, the verification data processing method is ended.

If the number of nodes in the min-heap is more than the second preset threshold value, the method proceeds with Step S28, in which a statistic of all of the numbers of total verifications and all of the numbers of correct verifications in the min-heap is made, and a passing rate of CAPTCHA codes which correspond to the CAPTCHA response information from which all the verification data in the min-heap is obtained.

Figure 7:
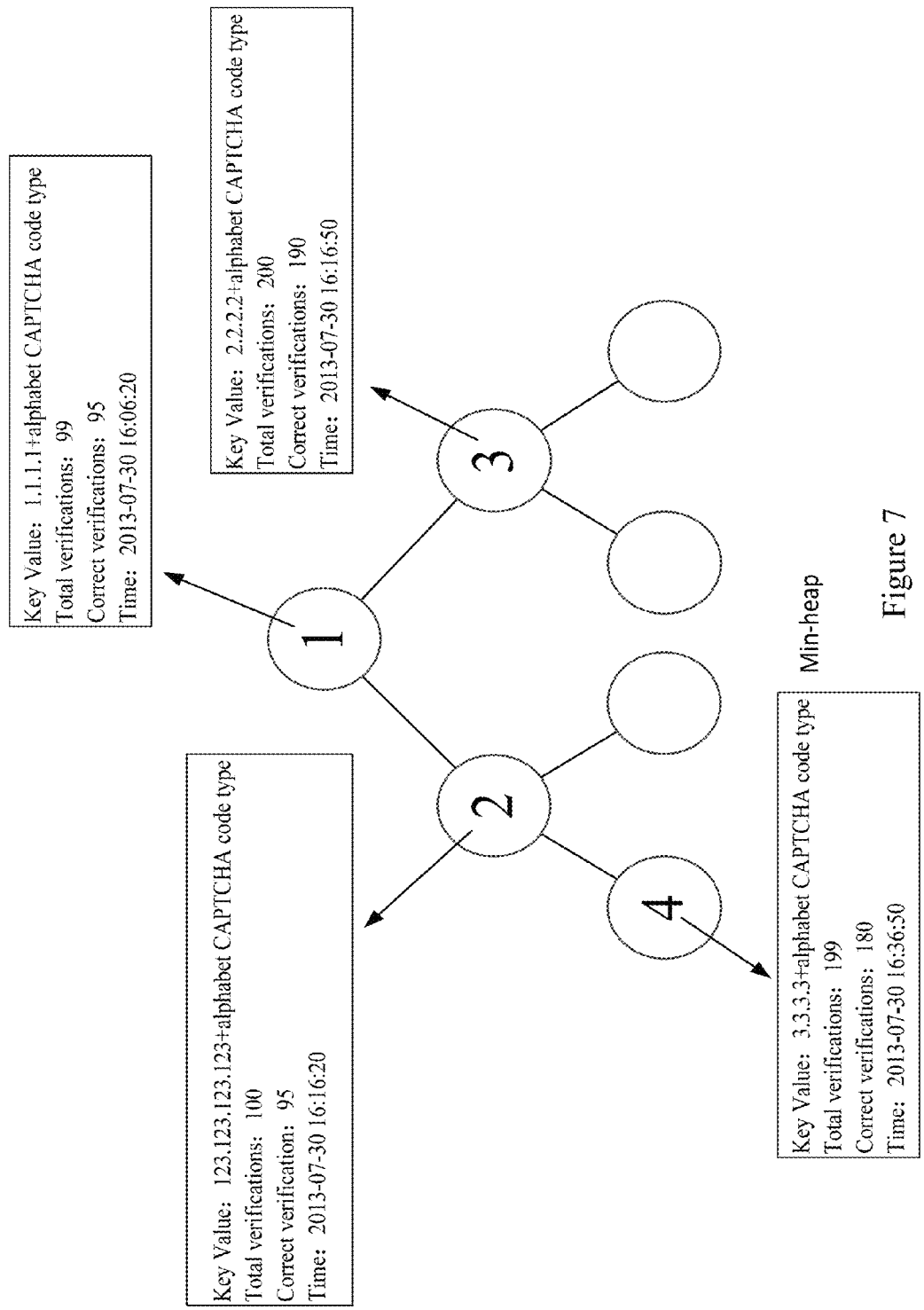
FIG. 7 is a schematic view showing the min-heap used in the verification data processing method according to the another embodiment of the present invention.

Particularly, when the number of nodes in the min-heap is more than the second preset threshold value, the server calculates weighted averages of all the numbers of total verifications and all the numbers of correct verifications in the min-heap, to calculate the passing rate of the CAPTCHA codes which correspond to the CAPTCHA response information from which all the verification data in the min-heap is obtained, and then outputs the statistical result. The calculation formula used in calculating the weighted averages and the passing rate is as follows:

$$\text{Passing rate} = \sum_{i=1}^{n} \frac{V_i * P_i}{\text{Sum}(V)},$$

where, $V_i$ denotes the number of total verifications (i.e. the number of total submissions of the CAPTCHA response information corresponding to the same CAPTCHA code type from the same IP address), $P_i$ denotes the ratio of correct verifications (i.e. the ratio of the number of correct verifications to the number of total verifications), and Sum (V) denotes a sum of the numbers of total verifications contained in verification data stored in all nodes of the min-heap. For example, as illustrated in FIG. 7, four node of the min-heap are stored with the verification data, and $V_i$ and $P_i$ corresponding to the respective verification data are such that: $V_1$=99, $P_1$=95/99; $V_2$=100, $P_2$=95/100; $V_3$=200, $P_3$=190/200; and $V_4$=199, $P_4$=180/199. As such, Sum(V)=99+100+200+199=59, and the passing rate may be calculated as 93.64% according to the previous formula. Considering that the types of the min-heaps are defined by the user types and CAPTCHA code types, the user type corresponding to the min-heap illustrated in FIG. 7 is the ordinary user type, and the CAPTCHA code type corresponding to the min-heap illustrated in FIG. 7 is the alphabet type, thus the calculated passing rate refers to the passing rate of alphabet CAPTCHA codes with respect to a group of users of the ordinary user type. As a result, the passing rates of different types of CAPTCHA codes with respect to groups of users of different user types can be obtained by statistics of data in different min-heaps, and the quality of the CAPTCHA can be precisely reflected to facilitate the improvement of the CAPTCHA by developers.

In the verification data processing method according to the present embodiment, the verification data is configured in the corresponding min-heap according to the user type and the CAPTCHA code type, and a statistic on the verification data in the min-heap is made to obtain the passing rate of CAPTCHA codes. Since each min-heap corresponds to one user type and one CAPTCHA code type, the passing rate of each type of CAPTCHA codes with respect to each of different user types can be obtained from the statistic of the verification data in different min-heaps, which leads to strong pertinence, and thus the accuracy of the result of verification data processing is promoted so that the obtained passing rate of the CAPTCHA codes is more valuable.

Figure 8:
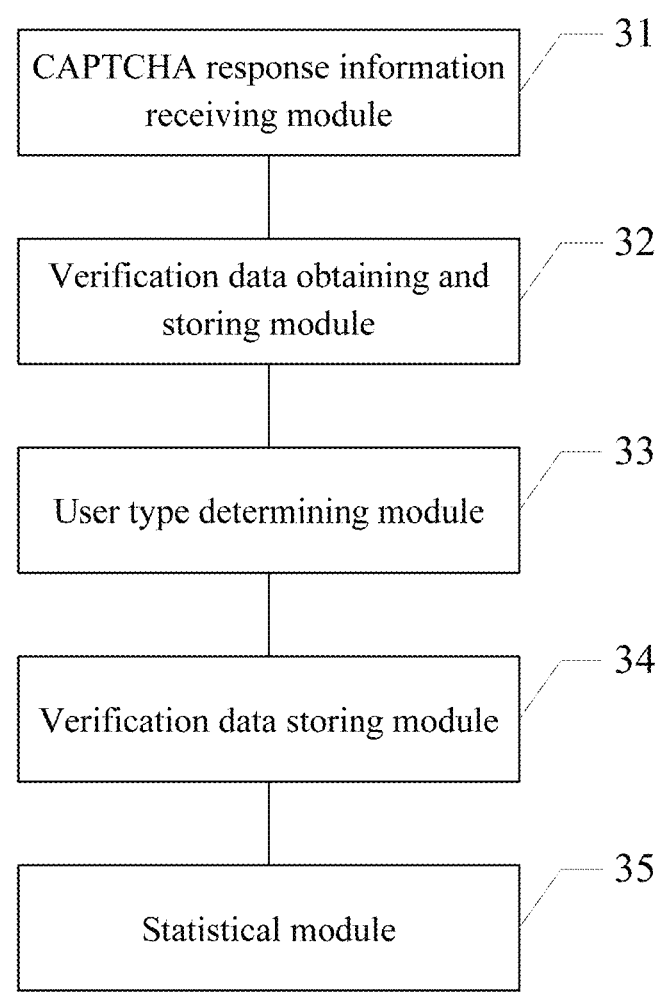
FIG. 8 is a schematic structural view showing a verification data processing device according to still another embodiment of the present invention.

FIG. 8 is a schematic structural view showing a verification data processing device according to still another embodiment of the present invention. The verification data processing device according to the present embodiment can be used to perform the verification data processing method according to the above embodiment. As illustrated in FIG. 8, a verification data processing device 30 includes: a CAPTCHA response information receiving module 31, a verification data obtaining and storing module 32, a user type determining module 33, a verification data storing module 34, and a statistical module 35.

The CAPTCHA response information receiving module 31 is configured to receive CAPTCHA response information that is sent by a user through a user terminal and obtain an IP address of the user terminal from the received CAPTCHA response information.

The verification data obtaining and storing module 32 is configured to obtain verification data by verifying the CAPTCHA response information obtained by the CAPTCHA response information receiving module 31 and store the obtained verification data in a preset hash table, where the verification data includes the type of a CAPTCHA code corresponding to the CAPTCHA response information, and the number of total verifications and the number of correct verifications both corresponding to the IP address of the user terminal.

The user type determining module 33 is configured to determine the user type of the user, according to the IP address of the user terminal obtained by the CAPTCHA response information receiving module 31 and the number of total verifications and the number of correct verifications obtained by the verification data obtaining and storing module 32.

The verification data storing module 34 is configured to store the verification data in a corresponding min-heap according to the CAPTCHA code type obtained by the verification data obtaining and storing module 32 and the user type of the user obtained by the user type determining module 33.

The statistical module 35 is configured to make a statistic of all the numbers of total verifications and all the numbers of correct verifications in the min-heap to obtain a passing rate of CAPTCHA codes, which correspond to the CAPTCHA response information from which all the verification data in the min-heap is obtained.

As to the implementations of the functions of each module of the verification data processing device 30 according to the present disclosure, reference may be made to the previous description made above with reference to FIG. 1 to FIG. 7, which will not be repeatedly described herein. The verification data processing device according to the present embodiment may be a part of a server.

In the verification data processing device according to the present embodiment, the verification data is configured in the corresponding min-heap according to the user type and the CAPTCHA code type, and a statistic on the verification data in the min-heap is made to obtain the passing rate of CAPTCHA codes. Since each min-heap corresponds to one user type and one CAPTCHA code type, the passing rate of each type of CAPTCHA codes with respect to each of different user type can be obtained from the statistics of the verification data in different min-heaps, which leads to strong pertinence, and thus the accuracy of the result of verification data processing is promoted so that the obtained passing rate of the CAPTCHA codes is more valuable.

Figure 9:
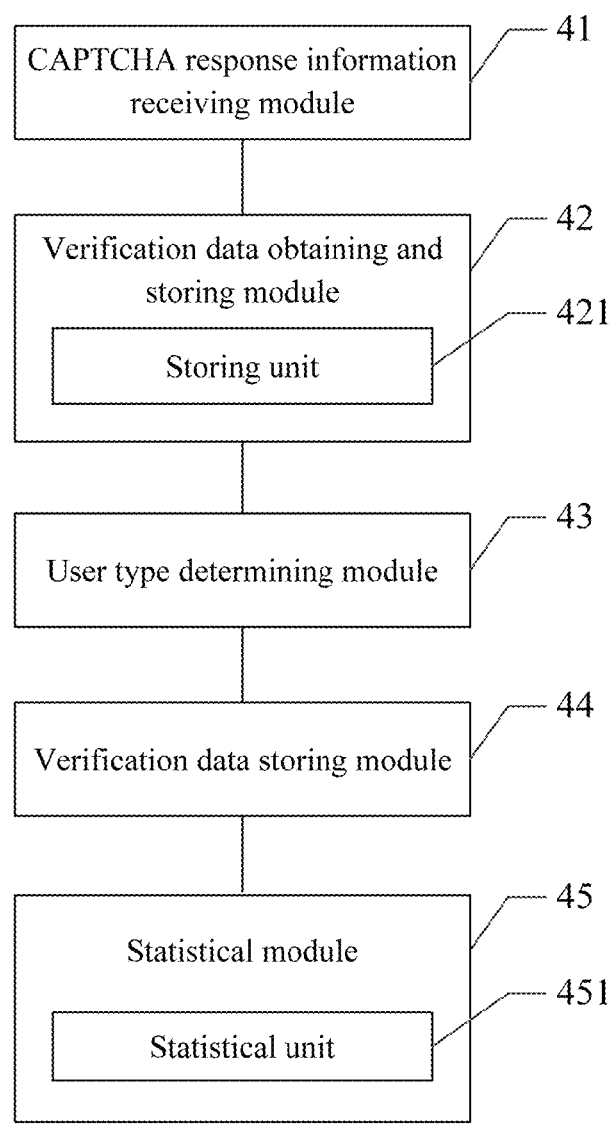
FIG. 9 is a schematic structural view showing a verification data processing device according to still another embodiment of the present invention.

FIG. 9 is a schematic structural view showing a verification data processing device according to still another embodiment of the present invention. The verification data processing device according to the present embodiment can be used to perform the verification data processing method according to the above embodiment. As illustrated in FIG. 9, a verification data processing device 40 includes: a CAPTCHA response information receiving module 41, a verification data obtaining and storing module 42, a user type determining module 43, a verification data storing module 44 and a statistical module 45.

The CAPTCHA response information receiving module 41 is configured to receive CAPTCHA response information that is sent by a user through a user terminal and obtain an IP address of the user terminal from the received CAPTCHA response information.

The verification data obtaining and storing module 42 is configured to obtain verification data by verifying the CAPTCHA response information obtained by the CAPTCHA response information receiving module 41 and store the obtained verification data in a preset hash table, where the verification data includes the type of a CAPTCHA code corresponding to the CAPTCHA response information, and the number of total verifications and the number of correct verifications both corresponding to the IP address of the user terminal. The verification data obtaining and storing module 42 includes: a storing unit 421 which is configured to determine a corresponding storage position of the verification data in the preset hash table according to the type of the CAPTCHA code and the IP address of the user terminal, and store the verification data at the determined storage position.

Figure 10:
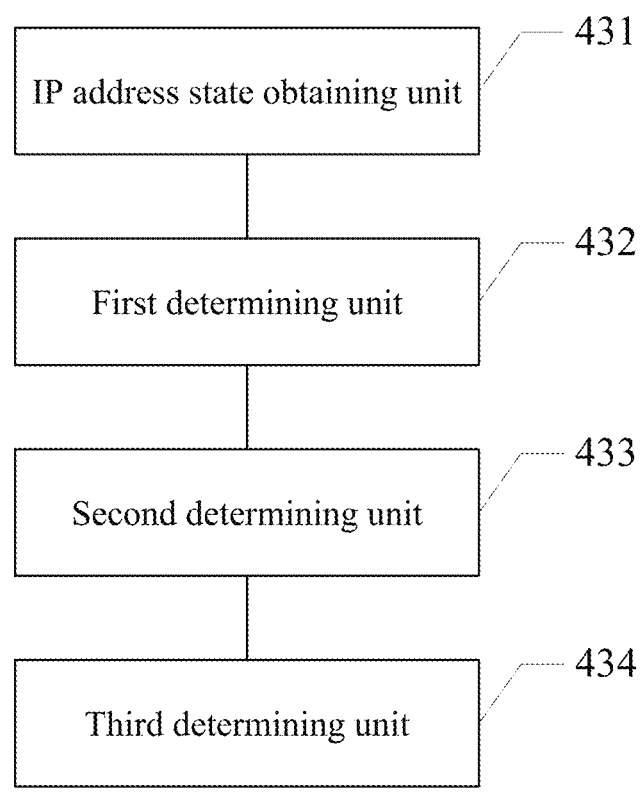
FIG. 10 is a schematic structural view showing a user type determining module in the verification data processing device according to the embodiment of the present invention.

The user type determining module 43 is configured to determine the user type of the user, according to the IP address of the user terminal obtained by the CAPTCHA response information receiving module 41 and the number of total verifications and the number of correct verifications obtained by the verification data obtaining and storing module 42. As illustrated in FIG. 10, the user type determining module 43 includes: an IP address state obtaining unit 431, a first determining unit 432, a second determining unit 433 and a third determining unit 434. The IP address state obtaining unit 431 is configured to obtain the state of the IP address of the user terminal; the first determining unit 432 is configured to determine the type of the user as a first type, if the state of the IP address of the user terminal obtained by the IP address state obtaining unit 431 is normal and the ratio of the number of correct verifications to the number of total verifications is more than a first preset threshold value; the second determining unit 433 is configured to determine the type of the user as a second type, if the state of the IP address of the user terminal obtained by the IP address state obtaining unit 431 is abnormal and the ratio of the number of correct verifications to the number of total verifications is more than the first preset threshold value; and the third determining unit 434 is configured to determine the type of the user as a third type, if the ratio of the number of correct verifications to the number of total verifications is less than or equal to the first preset threshold value.

Figure 11:
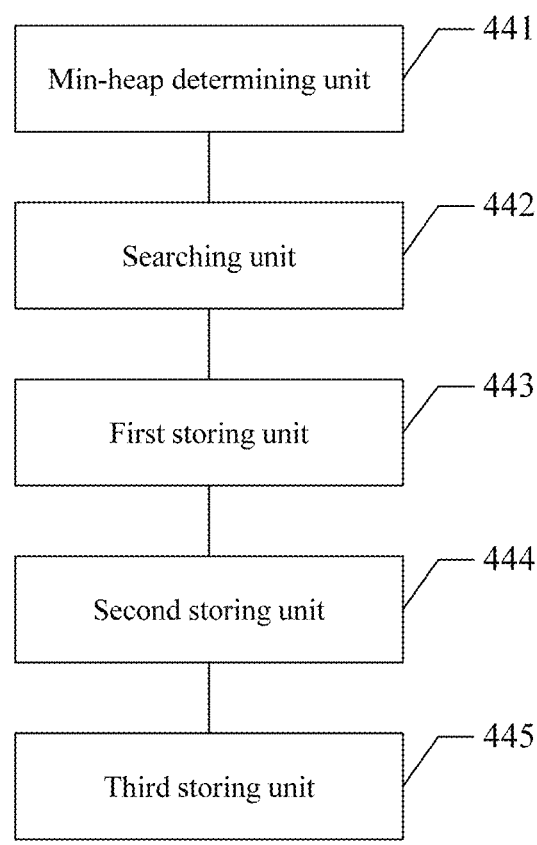
FIG. 11 is a schematic structural view showing a verification data storing module in the verification data processing device according to the embodiment of the present invention.

The verification data storing module 44 is configured to store the verification data in a corresponding min-heap according to the CAPTCHA code type obtained by the verification data obtaining and storing module 42 and the user type of the user obtained by the user type determining module 43. As illustrated in FIG. 11, the verification data storing module 44 includes: a min-heap determining unit 441, a searching unit 442, a first storing unit 443, a second storing unit 444 and a third storing unit 445. The min-heap determining unit 441 is configured to determine a corresponding min-heap according to the CAPTCHA code type and the user type of the user; the searching unit 442 is configured to search for a node of the min-heap that corresponds to the CAPTCHA code type and the IP address of the user terminal according to the CAPTCHA code type and the IP address of the user terminal; the first storing unit 443 is configured to store the IP address of the user terminal and the verification data in the corresponding node, if the corresponding node has been found by the searching unit 442; the second storing unit 444 is configured to, if the corresponding node is not found by the searching unit 442 and the number of nodes included in the min-heap is less than a second preset threshold value, generate a node for the verification data, determine a position of the generated node in the min-heap according to the number of total verifications, and store the IP address of the user terminal and the verification data in the generated node; and the third storing unit 445 is configured to store the IP address of the user terminal and the verification data in the root node of the min-heap and sort all nodes of the min-heap according to the numbers of total verifications, if the corresponding node is not found by the searching unit 442, the number of nodes included in the min-heap is equal to the second preset threshold value, and the number of total verifications is more than the number of total verifications stored in the root node of the min-heap.

In an implementation, min-heap index information corresponding to the verification data is stored at a corresponding storage position of the verification data in the preset hash table, and the min-heap index information includes position information of the node corresponding to the verification data within the min-heap.

In an implementation, the searching unit 442 is further configured to determine the storage position of the CAPTCHA code type and the IP address of the user terminal in the preset hash table according to the CAPTCHA code type and the IP address of the user terminal, obtain the min-heap index information stored at the storage position, and search for a node of the min-heap that corresponds to the CAPTCHA code type and the IP address of the user terminal, according to the min-heap index information.

The statistical module 45 is configured to make a statistic of all the numbers of total verifications and all the numbers of correct verifications in the min-heap to obtain a passing rate of CAPTCHA codes which correspond to the CAPTCHA response information from which all the verification data in the min-heap is obtained. The statistical module 45 includes a statistical unit 451 which is configured to calculate weighted averages of all the numbers of total verifications and all the numbers of correct verifications in the min-heap, to obtain the statistics of all the numbers of total verifications and all the numbers of correct verifications in the min-heap.

As to the implementations of the functions of every module of the verification data processing device 40 according to the present disclosure, reference may be made to the previous description made above with reference to FIG. 1 to FIG. 7, which will not be repeatedly described herein. The verification data processing device according to the present embodiment may be a part of a server.

In the verification data processing device according to the present embodiment, the verification data is configured in the corresponding min-heap according to the user type and the CAPTCHA code type, and a statistic on the verification data in the min-heap is made to obtain the passing rate of CAPTCHA codes. Since each min-heap corresponds to one user type and one CAPTCHA code type, the passing rate of each type of CAPTCHA codes with respect to each of different user types can be obtained from the statistics of the verification data in different min-heaps, which leads to strong pertinence, and thus the accuracy of the result of verification data processing is promoted so that the obtained passing rate of the CAPTCHA codes is more valuable.

Figure 12:
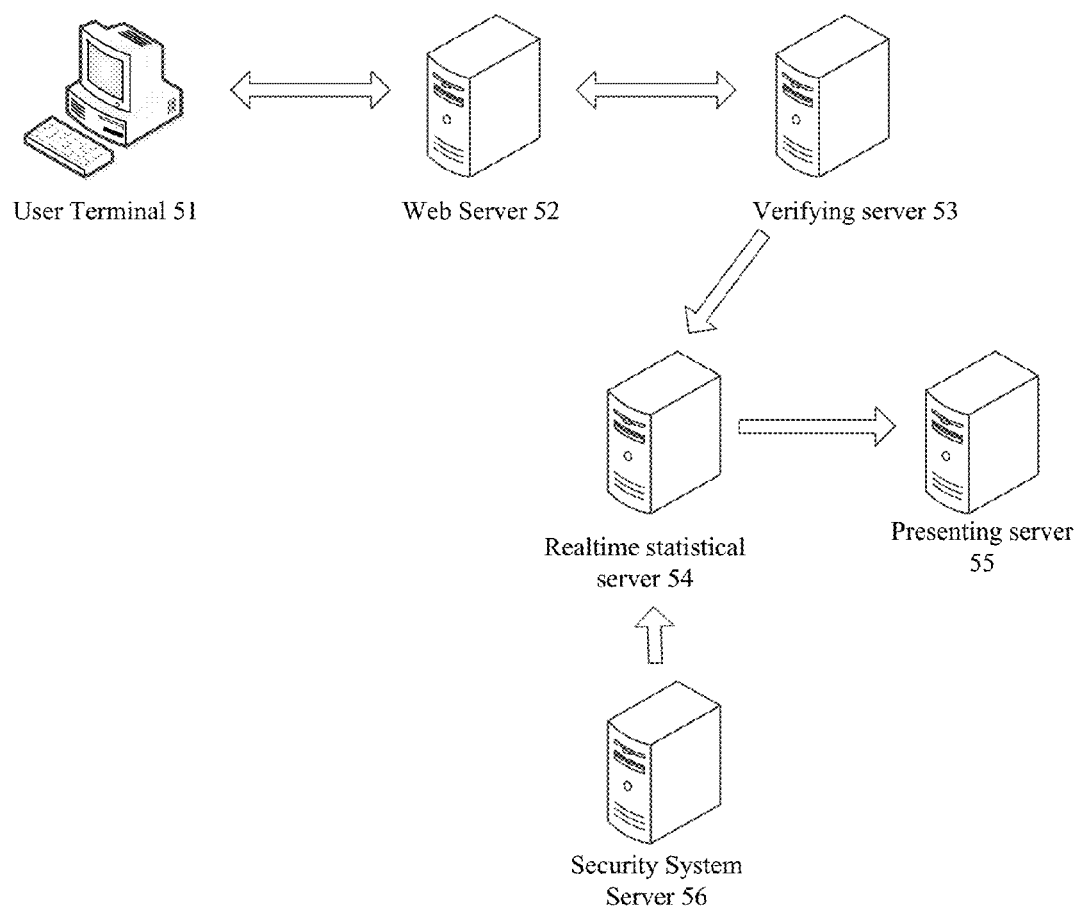
FIG. 12 is a schematic view showing a verification data processing system according to an embodiment of the present invention.

A verification data processing system is further provided according to an embodiment of the present invention, as illustrated in FIG. 12, and the verification data processing system 50 includes: a user terminal 51, a web server 52, a verifying server 53, a real-time statistical server 54, a presenting server 55 and a security system server 56.

The user terminal 51 is configured to receive a CAPTCHA answer input by a user, and encapsulate the CAPTCHA answer into CAPTCHA response information which is further sent to the web server 52 (such as a World Wide Web (WWW) server).

The web server 52 is configured to transmit the CAPTCHA response information received from the user terminal 51 to the CAPTCHA verifying server 53 for verifying, and to transmit a verification result returned by the CAPTCHA verifying server 53 to the user terminal 51, which then shows the verification result to the user.

The CAPTCHA verifying server 53 is configured to process a CAPTCHA verifying request from the web server 52, and send verification data containing the verification result to the real-time statistical server 54.

The real-time statistical server 54 is configured to store the verification data received from the verification data verifying server 53 in a multi-level hash table; to store information of abnormal IP addresses received from the security system server 56 in an abnormal-information list; to determine the user type of the user according to the state of the IP address of the user terminal from the abnormal-information list and the number of total verifications and the number of correct verifications in the verification data; to store the verification data into the corresponding min-heap; to make a statistic of all the numbers of total verifications and all the numbers of correct verifications in the min-heap to obtain a passing rate of CAPTCHA codes which correspond to the CAPTCHA response information from which all the verification data in the min-heap is obtained; and to report the statistical result to the presenting server 55 in real time (e.g. every minute).

The presenting server 55 is configured to receive the statistical result from the real-time statistical server 54, and presents the passing rates of each type of CAPTCHA codes with respect to different types of user groups in the form of curves by a graphical tool.

The security system server 56 is configured to obtain the information of abnormal IP addresses from various service and dimensional statistics, and transmit the obtained information of abnormal IP addresses to the real-time statistical server 54, so that the real-time statistical server 54 can distinguish different types of user groups by the information of abnormal IP addresses.

It is understood that all and a part of the web server 52, the CAPTCHA verifying server 53, the real-time statistical server 54, the presenting server 55 and the security system server 56 as described above can also be integrated in the same server as modules thereof to perform the corresponding functions.

As to the implementations of the functions of each module in the verification data processing system in the present embodiment, reference may be made to the method of the previous embodiment illustrated in FIG. 1 to FIG. 7 and the device of the embodiment illustrated in FIG. 8 to FIG. 11, which will not be repeatedly described herein.

It is noted that the embodiments in the present description are described in a progressive way, differences in an embodiment compared to other embodiments are focused, and a part of an embodiment may be apparent by referring to the description of a similar part of another embodiment. The device according to the embodiment is basically similar to the method according to the embodiment and is relatively simply described, and may be apparent by referring to the description of the method.

It is noted that the sequence terms such as first and second are merely used to distinguish an object or an operation from another one herein, and do not necessarily require or imply actual relationships or orders between these objects or operations. In addition, terms like "include", "comprise" or any other variants thereof intend to mean non-exclusive containing, so that not only elements listed in a procedure, a method, an object or a device, but also not explicitly listed elements (including inherent elements) are included in the procedure, the method, the object or the device. In a situation without explicit restrictions, an element defined by the statement of "include a" does not exclude other same elements existing in the procedure, the method, the object or the device.

In light of the description of the above embodiments, it should be understood by the skilled person in the art that the present invention can be embodied by software and the necessary universal hardware, or merely hardware, but mostly the former is a preferable embodiment. Based on this understanding, the technical solution of the present invention may be substantially embodied in a software product or a part of the technical solution that contributes to the prior art may be embodied in a software product, and the computer software can be stored in the storage medium which may be a floppy disk, a Read-only Memory, a Random Access Memory, a Flash, a hard disk, an optical disk and the like, instructions included in the software product are configured to instruct a computer device (such as a personal computer, a server or a network device) to execute the method described in the embodiments of the present invention. A storage medium including computer-executable instructions is provided by the present disclosure, where the computer-executable instructions are configured to perform a verification data processing method, and the method includes: receiving CAPTCHA response information that is sent by a user through a user terminal and obtaining an IP address of the user terminal from the CAPTCHA response information; obtaining verification data by verifying the CAPTCHA response information and storing the verification data in a preset hash table, where the verification data includes the type of a CAPTCHA code corresponding to the CAPTCHA response information, and the number of total verifications of the CAPTCHA response information and the number of correct verifications among the total verifications both corresponding to the IP address of the user terminal; determining the user type of the user according to the IP address of the user terminal, the number of total verifications and the number of correct verifications; storing the verification data in a corresponding min-heap according to the type of the CAPTCHA code and the user type of the user; and making a statistic of all the numbers of total verifications and all the numbers of correct verifications in the min-heap to obtain a passing rate of CAPTCHA codes which correspond to the CAPTCHA response information from which all the verification data in the min-heap is obtained.

The above description is merely the some embodiments of the present invention, which are not intended to limit the present invention. Although the present disclosure is disclosed as previous embodiments, they are not intended to limit the present invention. When an equivalent embodiment can be obtained through the modification or change of the previous embodiments, any modification, equivalent alteration and improvement made to the previous embodiments in the principle of the present invention without going beyond the scope of the present invention is included into the protection scope of the present invention.

The invention claimed is:

1. A verification data processing method, comprising:
receiving, by a server, CAPTCHA response information that is sent by a user through a user terminal;
obtaining an IP address of the user terminal from the CAPTCHA response information;
obtaining verification data by verifying the CAPTCHA response information;
storing the verification data in a preset hash table, wherein the verification data comprises a type of a CAPTCHA code corresponding to the CAPTCHA response information, and a number of total verifications of CAPTCHA response information and a number of correct verifications among the total verifications which both correspond to the IP address of the user terminal;
determining a user type of the user according to the IP address of the user terminal, the number of total verifications and the number of correct verifications;
storing the verification data in a min-heap according to the type of the CAPTCHA code and the user type of the user; and
making a statistic of all the numbers of total verifications and all the numbers of correct verifications in the min-heap to obtain a passing rate of CAPTCHA codes which correspond to the CAPTCHA response information from which all the verification data in the min-heap is obtained.

2. The verification data processing method according to claim 1, wherein, the storing the verification data in a preset hash table comprises:
determining a corresponding storage position of the verification data in the preset hash table according to the type of the CAPTCHA code and the IP address of the user terminal, and storing the verification data at the corresponding storage position.

3. The verification data processing method according to claim 1, wherein, determining the user type of the user according to the IP address of the user terminal, the number of total verifications and the number of correct verifications comprises:
obtaining a state of the IP address of the user terminal;
determining the user type of the user as a first type, if the state of the IP address of the user terminal is normal and a ratio of the number of correct verifications to the number of total verifications is more than a preset threshold ratio value;
determining the user type of the user as a second type, if the state of the IP address of the user terminal is abnormal and the ratio of the number of correct verifications to the number of total verifications is more than the preset threshold ratio value; and
determining the user type of the user as a third type, if the ratio of the number of correct verifications to the number of total verifications is less than or equal to the preset threshold ratio value.

4. The verification data processing method according to claim 1, wherein, the storing the verification data in the min-heap according to the type of the CAPTCHA code and the user type of the user comprises:
determining the min-heap according to the type of the CAPTCHA code and the user type of the user;
searching in the min-heap for a node corresponding to the type of the CAPTCHA code and the IP address of the user terminal;
if the corresponding node is found, storing the IP address of the user terminal and the verification data in the corresponding node;

if the corresponding node is not found and the number of nodes in the min-heap is less than a preset threshold value of nodes, generating a node for the verification data, determining a position for the generated node in the min-heap according to the number of total verifications, and storing the IP address of the user terminal and the verification data in the generated node; and if the corresponding node is not found and the number of nodes in the min-heap is equal to the preset threshold value of nodes and the number of total verifications is more than a number of total verifications at a root node in the min-heap, storing the IP address of the user terminal and the verification data at the root node in the min-heap and sorting all nodes in the min-heap.

5. The verification data processing method according to claim 4, wherein, min-heap index information corresponding to the verification data is stored in a storage position corresponding to the verification data in the preset hash table, and the min-heap index information comprises position information of the node corresponding to the verification data in the min-heap;

searching for, in the min-heap, a node corresponding to the type of the CAPTCHA code and the IP address of the user terminal according to the type of the CAPTCHA code and the IP address of the user terminal comprises:

determining a storage position of the type of the CAPTCHA code and the IP address of the user terminal in the preset hash table according to the type of the CAPTCHA code and the IP address of the user terminal, and obtaining the min-heap index information stored at the determined storage position; and searching for, in the min-heap, a node corresponding to the type of the CAPTCHA code and the IP address of the user terminal according to the min-heap index information.

6. The verification data processing method according to claim 1, wherein, the making a statistic of all the numbers of total verifications and all the numbers of correct verifications in the min-heap comprises:

calculating weighted averages of all the numbers of total verifications and all the number of correct verifications in the min-heap to obtain the statistics of all the numbers of total verifications and all the number of correct verifications in the min-heap.

7. A verification data processing device, comprising one or more processors operating in conjunction with a memory and a plurality of modules, wherein the plurality of modules comprise:

a CAPTCHA response information receiving module, which is configured to receive CAPTCHA response information that is sent by a user through a user terminal, and to obtain an IP address of the user terminal from the received CAPTCHA response information;

a CAPTCHA obtaining and storing module, which is configured to obtain verification data by verifying the CAPTCHA response information obtained by the CAPTCHA response information receiving module, and store the verification data in a preset hash table, wherein the verification data comprises a type of a CAPTCHA code corresponding to the CAPTCHA response information, a number of total verifications of the CAPTCHA response information and a number of correct verifications among the total verifications which both correspond to the IP address of the user terminal;

a user type determining module, which is configured to determine a user type of the user according to the IP address of the user terminal obtained by the CAPTCHA response information receiving module, the number of total verifications and the number of correct verifications obtained by the CAPTCHA obtaining and storing module;

a verification data storing module, which is configured to store the verification data in a min-heap according to the type of the CAPTCHA code obtained by the verification data obtaining and storing module and the user type of the user obtained by the user type determining module; and a statistical module, which is configured to make a statistic of all the numbers of total verifications and all the numbers of correct verifications in the min-heap to obtain a passing rate of CAPTCHA codes that correspond to the CAPTCHA response information from which all the verification data in the min-heap is obtained.

8. The verification data processing device according to claim 7, wherein, the verification data obtaining and storing module comprises a storing unit, which is configured to determine a corresponding storage position of the verification data in the preset hash table according to the type of the CAPTCHA code and the IP address of the user terminal, and store the verification data at the determined storage position.

9. The verification data processing device according to claim 7, wherein, the user type determining module comprises:

an IP address state obtaining unit, which is configured to obtain a state of the IP address of the user terminal;

a first determining unit, which is configured to determine the user type of the user as a first type, if the state of the IP address of the user terminal obtained by the IP address state obtaining unit is normal and the ratio of the number of correct verifications to the number of total verifications is more than a preset threshold ratio value;

a second determining unit, which is configured to determine the user type of the user as a second type, if the state of the IP address of the user terminal obtained by the IP address state obtaining unit is abnormal and the ratio of the number of correct verifications to the number of total verifications is more than the preset threshold ratio value; and a third determining unit, which is configured to determine the user type of the user as a third type, if the ratio of the number of correct verifications to the number of total verifications is less than or equal to the preset threshold ratio value.

10. The verification data processing device according to claim 7, wherein, the verification data storing module comprises:

a min-heap determining unit, which is configured to determine the min-heap according to the type of the CAPTCHA code and the user type of the user;

a searching unit, which is configured to search in the min-heap for a node corresponding to the type of the CAPTCHA code and the IP address of the user terminal according to the type of the CAPTCHA code and the IP address of the user terminal;

a first storing unit, which is configured to store the IP address of the user terminal and the verification data in the corresponding node, if the corresponding node is found by the searching unit;

a second storing unit, which is configured to, if the corresponding node is not found by the searching unit and the number of nodes in the min-heap is less than a second preset threshold value, generate a node for the verification data, determine a position of the generated node in the min-heap according to the number of total verifications, and store the IP address of the user terminal and the verification data in the generated node; and a third storing unit, which is configured to store the IP address of the user terminal and the verification data in a root node in the min-heap and store all nodes in the min-heap, if: the corresponding node is not found by the searching unit, the number of the nodes in the min-heap is equal to the second preset threshold value, and the number of total verifications is more than the number of total verifications included in verification data stored in the root node in the min-heap.

11. The verification data processing device according to claim 10, wherein, min-heap index information corresponding to the verification data is also stored at a corresponding storage position of the verification data in the preset hash table, and the min-heap index information comprises position information of the node corresponding to the verification data in the min-heap;

wherein the searching unit is further configured to determine a storage position of the type of the CAPTCHA code and the IP address of the user terminal in the preset hash table according to the type of the CAPTCHA code and the IP address of the user terminal, obtain the min-heap index information stored at the determined storage position, and search in the min-heap for a node corresponding to the type of the CAPTCHA code and the IP address of the user terminal according to the min-heap index information.

12. The verification data processing device according to claim 7, wherein, the statistical module comprises:

a statistical unit, which is configured to calculate weighted averages of all the numbers of total verifications and all the numbers of correct verifications in the min-heap, to obtain the statistic of all the numbers of the total verifications and all the numbers of the correct verifications in the min-heap.

13. A non-transitory computer-readable storage medium comprising computer-executable instructions, wherein, the computer-executable instructions are configured to perform a verification data processing method when being executed by a computer processor, and the method comprises:

receiving CAPTCHA response information that is sent by a user through a user terminal;

obtaining an IP address of the user terminal from the CAPTCHA response information;

obtaining verification data by verifying the CAPTCHA response information, and storing the verification data in a preset hash table, wherein the verification data comprises a type of a CAPTCHA code corresponding to the CAPTCHA response information, and a number of total verifications of CAPTCHA response information and a number of correct verifications among the total verifications which both correspond to the IP address of the user terminal;

determining a user type of the user according to the IP address of the user terminal, the number of total verifications and the number of correct verifications;

storing the verification data in a min-heap according to the type of the CAPTCHA code and the user type of the user; and making a statistic of all the numbers of total verifications and all the numbers of correct verifications in the min-heap, to obtain a passing rate of CAPTCHA codes which correspond to the CAPTCHA response information from which all the verification data in the min-heap is obtained.

14. The non-transitory computer-readable storage medium according to claim 13, wherein the method further comprises:

determining the min-heap according to the type of the CAPTCHA code and the user type of the user;

searching in the min-heap for a node corresponding to the type of the CAPTCHA code and the IP address of the user terminal;

if the corresponding node is found, storing the IP address of the user terminal and the verification data in the corresponding node;

if the corresponding node is not found and the number of nodes in the min-heap is less than a preset threshold value of nodes, generating a node for the verification data, determining a position for the generated node in the min-heap according to the number of total verifications, and storing the IP address of the user terminal and the verification data in the generated node; and if the corresponding node is not found and the number of nodes in the min-heap is equal to the preset threshold value of nodes and the number of total verifications is more than a number of total verifications at a root node in the min-heap, storing the IP address of the user terminal and the verification data at the root node in the min-heap and sorting all nodes in the min-heap.

15. The non-transitory computer-readable storage medium according to claim 13, wherein the method further comprises:

determining the min-heap according to the type of the CAPTCHA code and the user type of the user;

searching in the min-heap for a node corresponding to the type of the CAPTCHA code and the IP address of the user terminal;

if the corresponding node is found, storing the IP address of the user terminal and the verification data in the corresponding node;

if the corresponding node is not found and the number of nodes in the min-heap is less than a preset threshold value of nodes, generating a node for the verification data, determining a position for the generated node in the min-heap according to the number of total verifications, and storing the IP address of the user terminal and the verification data in the generated node; and if the corresponding node is not found and the number of nodes in the min-heap is equal to the preset threshold value of nodes and the number of total verifications is more than a number of total verifications at a root node in the min-heap, storing the IP address of the user terminal and the verification data at the root node in the min-heap and sorting all nodes in the min-heap.

* * * * *